United States Patent Office 2,748,161
Patented May 29, 1956

2,748,161

METHOD OF FORMING PHTHALALDEHYDIC ACID FROM PENTACHLOROXYLENE

James D. Head and Owen D. Ivins, Midland, Mich., assignors to The Dow Chemical Company, Midland, Mich., a corporation of Delaware No Drawing. Application March 31, 1952,
Serial No. 279,683

8 Claims. (Cl. 260—515)

This invention relates to the preparation of phthalaldehydic acid. It pertains especially to an improved method for carrying out the hydrolysis of the pentachloro-ortho-xylene having the formula:

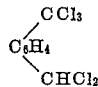

to form phthalaldehydic acid. The invention also concerns the preparation of aqueous solutions containing such acid and relates to further treatment of the solutions.

Phthalaldehydic acid and methods of making the same are known. Austin et al. in United States Patent No. 2,047,946, describe a procedure wherein phthalaldehydic acid is prepared by hydrolysis of chlorophthalide in an aqueous medium. The side chain chlorination of ortho-xylene to form the petachloro derivative thereof having the above formula is known. Colson and Gautier, Annales de chimie et de physique, Series 6, vol. 11, pages 26–30 (1887), describe the pentachloro-ortho-xylene and obtained phthalaldehydic acid by hydrolysis of the compound in an aqueous medium. Attempts to hydrolyze the pentachloro-ortho-xylene by heating the same in admixture with water or an aqueous solution of hydrochloric acid demonstrates that the hydrolysis proceeds quite slowly. Hydrolysis of the pentachloro-ortho-xylene with water, or an aqueous solution of hydrochloric acid, requires heating of the compound in admixture with such aqueous medium for a period of several days, e. g. for from three to four days or longer, at a reflux temperature in order to complete the hydrolysis reaction. Hydrolysis of the pentachloro-ortho-xylene cannot conveniently be carried out in an alkaline aqueous medium to form phthalaldehydic acid, since the aldehydic nature of the product results in the formation of condensation by-products or in the formation of colored substances which are difficultly separable from the phthalaldehydic acid product.

It is an object of the invention to provide an improved method for carrying out the hydrolysis of a pentachloro-ortho-xylene having the formula:

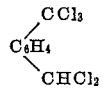

to form phthalaldehydic acid. Another object is to provide a method for carrying out the hydrolysis of the pentachloro-ortho-xylene having the above formula, in the presence of an aqueous medium containing an aromatic sulfonic acid as catalyst to form phthalaldehydic acid. Still another object is to provide a catalyst for promoting the hydrolysis of pentachloro-ortho-xylene to form phthalaldehydic acid in an aqueous medium. A further object is to prepare aqueous solutions containing phthalaldehydic acid or a salt thereof, by hydrolysis of the above-mentioned pentachloro-ortho-xylene in admixture with an aqueous solution containing an aromatic sulfonic acid. Other and related objects will become apparent from the following description of the invention.

According to the invention a pentachloro-ortho-xylene having the above formula can readily be hydrolyzed to form phthalaldehydic acid by heating the same to a reaction temperature between 90° and 120° C. in admixture with an aqueous solution containing from 8 to 45 per cent by weight of an aromatic sulfonic acid.

Any aromatic sulfonic acid derived from an aromatic hydrocarbon of the benzene or naphthalene series, i. e. containing not more than 10 carbon atoms in the aromatic nucleus, or a nuclear halogenated derivative thereof, may be used in the process. Examples of suitable aromatic sulfonic acids are benzene sulfonic acid, toluene sulfonic acid, xylene sulfonic acid, naphthalene sulfonic acid, methylnaphthalene sulfonic acid, chlorobenzene sulfonic acid, dichlorobenzene sulfonic acid, chlorotoluene sulfonic acid, ethylbenzene sulfonic acid, sec.-butylbenzene sulfonic acid, diethylbenzene sulfonic acid, ethyltoluene sulfonic acid, bromobenzene sulfonic acid, bromotoluene sulfonic acid, isopropylbenzene sulfonic acid, dichloronaphthalene sulfonic acid, tetrahydronaphthalene sulfonic acid, isopropylchlorobenzene sulfonic acid, ethylchlorobenzene sulfuric acid, or sec.-butylchlorobenzene sulfonic acid. Mixtures of any two or more of such aromatic sulfonic acids may also be used. The term "aromatic sulfonic acid" as used herein pertains to the sulfonated aromatic hydrocarbons of the benzene and naphthalene series, i. e. containing not more than 10 carbon atoms in the aromatic nucleus, and nuclear halogenated derivatives thereof, which aromatic sulfonic acid may contain in addition to the sulfo group a total of from one to two halogen atoms, e. g. chlorine or bromine atoms, or lower alkyl radicals each containing not more than four carbon atoms, as nuclear substituents.

The aromatic sulfonic acid may be used in concentration of from 8 to 45 per cent, preferably from 10 to 30 per cent, by weight of the aqueous solution. The aqueous acidic solution may be used in any desired proportion relative to the pentachloro-ortho-xylene employed. For convenience, the aqueous acidic solution is usually employed in amount corresponding to from 0.5 to 5, preferably from 1 to 2 parts by weight per part of the pentachloro-ortho-xylene used.

Since hydrochloric acid is formed in the reaction, the hydrolysis may be carried out employing an aqueous solution of hydrochloric acid, e. g. an aqueous solution containing 10 per cent by weight or more of hydrogen chloride, and an aromatic sulfonic acid.

The hydrolysis may be carried out by heating the pentachloro-ortho-xylene in admixture with an aqueous solution containing an aromatic sulfonic acid in suitable concentration at temperatures between 90° and 120° C. The reaction is usually carried out at the reflux temperature of the mixture at atmospheric pressure, i. e. at temperatures of from 100° to 110° C. Excess hydrohalic acid, e. g. hydrogen chloride, formed in the reaction is vented from the reaction zone. At higher temperatures, e. g. at temperatures of from 115° to 120° C., the hydrolysis may advantageously be carried out by heating a mixture of the pentachloro-ortho-xylene and an aqueous solution of an aromatic sulfonic acid under pressure in an autoclave or other pressure resistant vessel.

In practice, the pentachloro-ortho-xylene and an aqueous solution of an aromatic sulfonic acid as hereinbefore mentioned in concentration of from 8 to 45 per cent by weight of the solution, are mixed together in the desired proportions. The mixture is heated to 90° C., or above in a closed vessel, or to boiling under reflux, until the hydrolysis is substantially complete. The hydrolysis is usually complete upon disappearance of the oil layer.

Upon completion of the hydrolysis the phthalaldehydic acid may be recovered from the aqueous hydrolysis solution in usual ways, e. g. by cooling the solution to crystallize the phthalaldehydic acid and separating the crystals from the liquid, or by extracting the phthalaldehydic acid with a water-immiscible organic solvent such as benzene, toluene, chlorobenzene, carbon tetrachloride, ethylene dichloride, or chloroform, and separating the solvent from the product. The hydrolysis solution is usually diluted with water, e. g. an equal volume or more of water, prior to cooling the same to crystallize the phthalaldehydic acid from the aqueous solution.

The solubility of the phthalaldehydic acid in the aqueous solution becomes greater as the ratio of the aromatic sulfonic acid to the phthalaldehydic acid therein is increased. When employing an aqueous solution containing from 35 to 45 per cent by weight of an aromatic sulfonic acid as the hydrolysis medium, the phthalaldehydic acid separates quite slowly from the hydrolysis solution by crystallization, i. e. by cooling the aqueous solution to crystallize the phthalaldehydic acid therefrom. Certain of the aromatic sulfonic acids crystallize with water to form a crystalline material which has a freezing point close to that of phthalaldehydic acid. When attempt is made to separate phthalaldehydic acid from an aqueous hydrolysis solution containing such aromatic sulfonic acid by cooling the solution to room temperature or below, the crystalline material which is obtained contains both phthalaldehydic acid and the aromatic sulfonic acid. In such instance, the phthalaldehydic acid may be recovered from the aqueous hydrolysis solution containing such aromatic sulfonic acid by extracting the phthalaldehydic acid with a water-immiscible organic solvent, e. g. benzene, which does not appreciably dissolve the aromatic sulfonic acid. The phthalaldehydic acid is separated from the solvent in usual ways, e. g. by distillation of the solvent from the product, or by crystallization. One or more crystallizations may be necessary to obtain a pure product.

In a preferred practice of the invention, the pentachloro-ortho-xylene and an aqueous solution of the aromatic sulfonic acid in suitable concentration is heated to boiling under reflux until the hydrolysis is complete. The hydrolysis solution is extracted with a water-immiscible solvent to separate the phthalaldehydic acid. The aqueous liquid containing the aromatic sulfonic acid, together with hydrohalic acid, e. g. hydrochloric acid, formed in the reaction, is employed as the hydrolysis medium in succeeding reactions. In such instance, wherein the hydrolysis mixture is saturated with respect to the hydrohalic acid, the excess acid, e. g. hydrogen chloride, formed in the solution is vented or withdrawn from the reaction zone and is recovered.

Phthalaldehydic acid is an intermediate for the preparation of other chemical compounds. For instance, it may be reacted with hydrazine, hydrazine hydrate, or hydrazine sulfate, to form phthalazone. When employed for such purpose, it is not necessary that the phthalaldehydic acid be separated from the aqueous medium in which it is formed. In such instance, the aqueous acidic hydrolysis solution containing the phthalaldehydic acid, formed by the hydrolysis of the pentachloro-ortho-xylene in admixture with an aqueous solution containing from 8 to 45 per cent by weight of an aromatic sulfonic acid as herein specified, is suitably diluted with water and is mixed with hydrazine, or a salt thereof, e. g. hydrazine hydrate or hydrazine sulfate, in amount at least chemically equivalent to the phthalaldehydic acid in the solution. The resulting solution is neutralized with an alkali such as sodium hydroxide, potassium hydroxide, sodium carbonate, or potassium carbonate, and the hydrazine is reacted with the phthalaldehydic acid, or a salt thereof, in the aqueous solution to form phthalazone. Alternatively, the aqueous acidic hydrolysis solution may be made alkaline, or neutralized, with an alkali prior to mixing the hydrazine therewith. The solution is made neutral after adding the hydrazine or a salt thereof, and the phthalaldehydic acid reacted therewith in the neutral or substantially neutral solution to form phthalazone. The reaction to form phthalazone may be carried out by heating the aqueous solution at temperatures between 60° and 100° C. over a period of from two to three hours. The solution is preferably maintained substantially neutral, i. e. at a pH value between 6 and 8, while carrying out the reaction to form phthalazone. The phthalazone is recovered by cooling the solution to room temperature or thereabout to crystallize the same from the liquid. The phthalazone is separated by filtering and is washed and dried.

The following examples illustrate ways in which the principle of the invention has been applied but are not to be construed as limiting the invention.

Example 1

A charge of 100 grams (0.36 mole) of pentachloro-ortho-xylene having the formula:

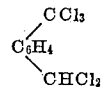

was mixed with a solution of 100 cc. of water and 28 grams of an aqueous 65 weight per cent solution of benzene sulfonic acid. The mixture was heated to boiling, i. e. at a reflux temperature, for a period of 20 hours. The oil layer disappeared and a clear solution was obtained. The solution was diluted with 200 cc. of water and was cooled to room temperature. A crystalline material separated from the liquid. The crystals were separated by filtering and were washed with water. The product was recrystallized from water. There was obtained 32 grams (0.21 mole) of phthalaldehydic acid as white crystals melting at 90°–93° C. The yield was 58 per cent, based on the weight of the pentachloro-ortho-xylene initially used.

In contrast to the above hydrolysis, a mixture of 100 grams of the pentachloro-ortho-xylene and 100 cc. of an aqueous 36 weight per cent solution of hydrochloric acid was heated under reflux for a period of 20 hours. Excess hydrogen chloride was vented from the reaction zone. There was no visible change in the volume of the oil layer, i. e. in the volume of the liquid pentachloro-ortho-xylene.

Example 2

A charge of 100 grams of the pentachloro-ortho-xylene described in Example 1, was mixed with a solution of 100 cc. of water and 14 grams of an aqueous 65 weight per cent solution of benzene sulfonic acid. The mixture was heated at a reflux temperature over a period of 40 hours to hydrolyze the pentachloro-ortho-xylene and form a clear solution containing phthalaldehydic acid.

A mixture of 100 grams of the pentachloro-ortho-xylene, 70 grams of an aqueous 65 weight per cent solution of benzene sulfonic acid and 100 cc. of water was heated at a reflux temperature for a period of 14 hours. A clear solution containing phthaldehydric acid was obtained.

Example 3

A charge of 100 grams (0.36 mole) of pentachloro-ortho-xylene as described in Example 1, was mixed with a solution of 100 cc. of water and 70 grams of toluene sulfonic acid. The mixture was heated to boiling, i. e. at temperatures between 100° and 110° C., under reflux for a period of 12 hours. A clear solution was obtained. It was diluted with 100 cc. of water and was cooled to room temperature. The mixture was allowed to stand at room temperature over a period of 48 hours. A crystalline material separated from the liquid. The crystalline product was separated by filtering and was washed with water. The product was recrystallized from water. There was obtained 28 grams of phthalaldehydic acid as white crystals melting at 91°–94° C. The filtrate was diluted with water to a total volume of 800 cc. Twenty grams of hydrazine hydrate were added thereto. The solution was neutralized with an aqueous 50 weight per cent solution of sodium hydroxide. The neutralized solution was heated at temperatures between 80° and 90° C. on a steam bath over a period of 2 hours, then cooled. A crystalline material separated from the liquid. The crystals were separated by filtering and were washed and dried. There was obtained 15 grams of phthalazone as nearly white crystals melting at 180°–183° C.

Example 4

A charge of 100 grams (0.36 mole) of the pentachloro-ortho-xylene described in Example 1, was mixed with a solution of 100 cc. of water and 70 grams of chlorobenzene sulfonic acid. The mixture was heated at a reflux temperature over a period of 18 hours. The oil layer disappeared. The solution was diluted with 800 cc. of water. It was made alkaline by adding an aqueous 50 weight per cent solution of sodium hydroxide thereto in amount sufficient to bring the solution to a pH value of 8. The resulting solution was filtered while hot to remove insoluble substances. Twenty-five grams of hydrazine hydrate were dissolved in the filtered solution. The solution was made neutral with dilute hydrochloric acid. The neutralized solution was heated at temperatures between 80° and 90° C. on a steam bath over a period of 2 hours. It was filtered while hot, then cooled to room temperature. A crystalline material separated from the liquid. The crystalline product was separated by filtering and was washed with water and dried. There was obtained 32 grams (0.22 mole) of phthalazone as nearly white crystals melting at 185°–187° C. The yield of phthalazone was 61 per cent based on the pentachloro-ortho-xylene initially used.

Example 5

A charge of 100 grams (0.36 mole) of a pentachloro-ortho-xylene similar to that described in Example 1, together with 100 cc. of water and 50 grams of dichloronaphthalene sulfonic acid was placed in a reflux flask. The mixture was heated at a reflux temperature over a period of 24 hours. The oil layer disappeared. The solution was diluted with 800 cc. of water. It was made alkaline with an aqueous 50 weight per cent solution of sodium hydroxide and was filtered while hot. The filtered solution had a pH value of 8. Twenty-five grams of hydrazine hydrate was added to the solution. The solution was neutralized with dilute hydrochloric acid and was heated at temperatures between 80° and 90° C. on a steam bath over a period of 2 hours, then cooled. A crystalline material separated from the liquid. The crystalline product was separated by filtering and was washed with water and dried. There was obtained 27 grams (0.18 mole) of phthalazone as nearly white crystals melting at 183°–185° C. The yield of phthalazone was 50 per cent based on the pentachloro-ortho-xylene initially used.

Example 6

A mixture of 100 grams of a pentachloro-ortho-xylene similar to that described in Example 1, 100 cc. of an aqueous 36 weight per cent solution of hydrochloric acid and 15 grams of an aqueous 65 weight per cent solution of benzene sulfonic acid, was placed in a glass reaction flask equipped with a reflux condenser. The mixture was heated at its boiling temperature over a period of 16 hours. A clear solution was obtained. Excess hydrogen chloride formed in the reaction was vented through the reflux condenser. The solution was extracted with 500 cc. of warm chlorobenzene to separate the phthalaldehydic acid. The aqueous and organic layers were separated. The aqueous layer was mixed with 100 grams of the pentachloro-ortho-xylene. The mixture was heated at its reflux temperature over a period of 20 hours to hydrolyze the pentachloro-ortho-xylene. Hydrogen chloride formed in the reaction was vented through the reflux condenser and was absorbed in an aqueous 10 weight per cent solution of sodium hydroxide. The alkali solution was analyzed and found to contain chloride in amount corresponding to a chemically equivalent amount of the pentachloro-ortho-xylene used in the reaction. The hydrolysis solution was extracted with 500 cc. of warm chlorobenzene to dissolve the phthalaldehydic acid. The aqueous and organic layers were separated. The organic layer was cooled to room temperature to crystallize the phthalaldehydic acid. The crystalline product was separated from the liquid and was washed and dried. There was obtained 45 grams (0.3 mole) of phthalaldehydic acid as white crystals.

Other modes of applying the principle of the invention may be employed instead of those explained, change being made as regards the steps or compounds herein employed, provided the steps or compounds stated in any of the following claims or the equivalent of such steps or compounds be employed.

We claim:

1. A method of forming phthalaldehydic acid which comprises hydrolyzing a pentachloro-ortho-xylene, having the formula:

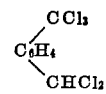

by heating the same in admixture with an aqueous solution containing from 8 to 45 per cent by weight of an aromatic sulfonic acid selected from the group consisting of the sulfonated aromatic hydrocarbons of the benzene and the naphthalene series and the sulfonated nuclear halogenated derivatives thereof, at a reaction temperature between 90° and 120° C.

2. A method of forming an aqueous solution containing an alkali metal salt of phthalaldehydic acid which comprises hydrolyzing a pentachloro-ortho-xylene, having the formula:

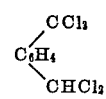

by heating the same in admixture with an aqueous solution containing from 8 to 45 per cent by weight of an aromatic sulfonic acid selected from the group consisting of the sulfonated aromatic hydrocarbons of the benzene and the naphthalene series and the sulfonated nuclear halogenated derivatives thereof, at a reaction temperature between 90° and 120° C. and neutralizing the solution with an alkali which is a member of the group consisting of sodium hydroxide, potassium hydroxide, sodium carbonate and potassium carbonate.

3. A method of making phthalaldehydic acid which comprises hydrolyzing a pentachloro-ortho-xylene, having the formula:

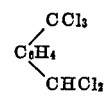

by heating the same in admixture with an aqueous solution containing from 8 to 45 per cent by weight of an aromatic sulfonic acid selected from the group consisting of the sulfonated aromatic hydrocarbons of the benzene and the naphthalene series and the sulfonated nuclear halogenated derivatives thereof, together with hydrogen chloride in amount sufficient to saturate the solution, by heating the mixture to boiling under reflux and withdrawing excess hydrogen chloride from the reaction zone as it is formed, then extracting the hydrolysis solution with a water-immiscible organic solvent for the phthalaldehydic acid, separating the aqueous and organic layers and reusing the aqueous liquid as the hydrolysis medium in a succeeding reaction.

4. A method of making phthalaldehydic acid which comprises hydrolyzing a pentachloro-ortho-xylene, having the formula:

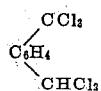

by heating the same in admixture with an aqueous solution containing from 8 to 45 per cent by weight of an aromatic sulfonic acid selected from the group consisting of the sulfonated aromatic hydrocarbons of the benzene and the naphthalene series and the sulfonated nuclear halogenated derivatives thereof, at a reaction temperature between 90° and 120° C., and separating the phthalaldehydic acid from the liquid.

5. A process, as described in claim 4, wherein the aromatic sulfonic acid is benzene sulfonic acid.

6. A process, as described in claim 4, wherein the aromatic sulfonic acid is toluene sulfonic acid.

7. A process, as described in claim 4, wherein the aromatic sulfonic acid is chlorobenzene sulfonic acid.

8. A process, as described in claim 4, wherein the aromatic sulfonic acid is dichloronaphthalene sulfonic acid.

References Cited in the file of this patent
UNITED STATES PATENTS 1,219,166    Schmidlin et al. _____ Mar. 13, 1917

OTHER REFERENCES

Gabriel et al.: Ber. Deut. Chem. 26, 523 (1893).
Liebermann: Ber. Deut. Chem. 26, 535 (1893).